Patented Feb. 1, 1949

2,460,516

UNITED STATES PATENT OFFICE 2,460,516

ION-EXCHANGE RESIN

Enrique L. Luáces, Dayton, Ohio, assignor, by mesne assignments, to The Commonwealth Engineering Company of Ohio, Dayton, Ohio, a corporation of Ohio No Drawing. Application October 20, 1943, Serial No. 507,038

4 Claims. (Cl. 260—38)

This invention relates to synthetic resins, and deals particularly with resins adapted for use in ion exchange in the treatment of water and other liquids.

Such resins may be used, for example, for the removal of hardness in the softening of water for domestic or industrial use or for the removal of impurities from solutions. Whether a given resin will remove ions or cations from a given solution will depend on the nature of the resin, and the nature of the resin is governed by its chemical composition and the method of its manufacture.

Synthetic resins of the general types used for this purpose are employed in the form of granules or particles of more or less uniform size. The size range will depend on the type of apparatus wherein it is used and the purpose for which it is intended.

Such resins are generally amorphous solids. The anion or cation exchange is effected at the point of contact between the resin particles or granules and the liquid being treated; consequently, a large proportion of the mass or weight of resin employed in any given installation will perform no useful purpose since the liquid being treated is unable to penetrate the body of the individual granules or particles of resin.

According to the present invention, it is possible to produce synthetic resins for use in anion or cation exchange which provide a maximum degree of usefulness per unit of weight. This is brought about by providing particles or granules of resin highly porous in character and thus permitting that the liquid being treated may come into contact with a surface area in each particle or granule far greater than the external surface of such particle or granule.

In the practice of this invention the resin is caused to be deposited on the surface of a porous body. Granular fuller's earth, pumice, silica gel, activated earth, activated alumina, active carbon, and other similar materials characterized by strength of structure, resistance to abrasion, and high porosity, may be and have been employed successfully and satisfactorily as a base material on which to deposit the resinous composition which is the active agent in anion or cation exchange reactions.

The ratio of active material (resin) to inert material (porous base) may vary from as little as 1:9 to as much as 2:1. The greater the degree of porosity of the base material, the greater the quantity of resin material which may be deposited thereon.

As a typical example, a resinous composition having a phenol aldehyde base may be prepared by adding 50 parts by weight of phenol to 75 parts by weight of granular fuller's earth, 30 x 60 mesh, heating the mixture to a temperature of from 200 to 300° F., and then adding 30% formaldehyde in small increments until a total quantity amounting to 25 parts by weight (100% basis) has been added, and then heating the mixture to a temperature of from 400 to 500° F. The resulting product is then broken up, if necessary, and screened to obtain particles of such size as might be desired.

In another instance, 50 parts by weight of phenol has been thoroughly mixed with 75 parts by weight of activated earth to produce a thick paste. Thereafter there has been added to the mixture 25 parts by weight of formaldehyde (100% basis) and the whole has been heated to a temperature of from 400 to 500° F. The resulting product has then been broken up and screened to the desired size.

The product of the present invention has been produced in other instances according to the foregoing example using powdered active carbon in place of activated earth.

The above examples are given merely as indication of the general manner in which the product of the present invention may be prepared. Mono and/or polyhydric phenols may be condensed with formaldehyde or other aldehydes of aromatic or aliphatic nature containing sulfonic or carboxylic acid groups, for instance. Likewise, mono and/or polyhydric phenols containing sulfonic or carboxylic acid groups in the nucleus or in the side chains may be used successfully in the practice of this invention, and the capacity of the resulting resin for the removal of anions or cations, as the case may be, may be altered by incorporating in the mixture suitable basic or acid groups compatible with the substances employed for preparing the resins. For example, it is known that the acid character of cation exchange resins of the phenol formaldehyde type may be enhanced by introducing sulfonic acid groups into the cyclic basic body either before or during the condensation, and that by treatment with sulfonating agents before or during the condensation the capacity for condensation of the phenols is materially affected since the number of links suitable to receive the aldehyde groups is reduced.

The essence of the present invention is to form the anion or cation exchange resin as a thin film over a base of porous material, thereby providing much greater utilization of the weight of resin in a given volume. For example, if an anion or cation exchange resin is utilized in the form of solid impervious granules or particles, only the outer surface area comes into contact with the liquid being treated, and only the weight of resin represented by that surface area is being utilized. However, if the same total weight of resin is deposited as a thin film over the large area provided by the structure of the porous base material, the weight of resin is utilized more completely because it is distributed as a thin film over a much greater total area.

It will be understood that while there have been described herein certain specific embodiments of the present invention, it is not intended thereby to have this invention limited to or circumscribed by the particular details of procedure, products, materials, or proportions herein set forth, in view of the fact that this invention is susceptible to modifications without departing from the spirit of this disclosure and the scope of the appended claims.

I claim:

1. The method of making an ion exchange mass comprising a porous base of a material having a large inner surface area for a given mass and a synthetic ion exchange resin consisting of phenol formaldehyde condensation product deposited over said surface area as a thin film, which consists in adding 50 parts by weight of phenol to 75 parts by weight of granular fuller's earth, heating the mixture at a temperature of from 200° to 300° F., adding 30% formaldehyde in small increments until a total quantity amounting to 25 parts by weight (100% basis) has been added, heating the mixture to a temperature of from 400° to 500° F., and then breaking and screening the resulting product.

2. The method of making an ion exchange mass comprising a porous base of large surface area and a synthetic ion exchange resin consisting of phenol formaldehyde condensation product deposited over said surface area as a thin film, which consists in adding 50 parts by weight of phenol to 75 parts by weight of activated earth and mixing to form a thick paste, adding to said paste 25 parts by weight of formaldehyde (100% basis), heating the resulting mixture at a temperature of from 400° to 500° F., and breaking and screening the resulting product.

3. The method of making an ion exchange mass comprising a porous inert inorganic adsorbent base of large inner surface area for a given mass and a synthetic ion exchange resin consisting of phenol formaldehyde condensation product over said surface area as a thin film, which consists in adding 50 parts by weight of phenol to 75 parts by weight of porous adsorbent material consisting of discrete granules of large inner surface area, adding to the resulting mixture 25 parts by weight of formaldehyde (100% basis), and heating the mixture at a temperature of from 400° to 500° F. for time sufficient to complete the reaction.

4. The method according to claim 3 in which the porous absorbent material consisting of discrete granules of large surface area is active carbon.

E. L. LUÁCES.

REFERENCES CITED

The following references are of record in the file of this patent:

UNITED STATES PATENTS

| Number | Name | Date |
|---|---|---|
| 2,195,196 | Wassenegger et al. | Mar. 26, 1940 |
| 2,281,194 | Holmes et al. | Apr. 28, 1942 |
| 2,361,754 | McFarland | Oct. 31, 1944 |

FOREIGN PATENTS

| Number | Country | Date |
|---|---|---|
| 506,291 | Great Britain | May 25, 1939 |

OTHER REFERENCES

Journal Physical Chemistry, article by Akeroyd et al., pages 343–352, vol. 42 (1938). Copy in Division 50.